(12) United States Patent
Karni et al.

(10) Patent No.: US 7,024,857 B2
(45) Date of Patent: Apr. 11, 2006

(54) SOLAR RECEIVER WITH A PLURALITY OF WORKING FLUID INLETS

(75) Inventors: Jacob Karni, Rehovot (IL); Rudi Bertocchi, Herzliya (IL)

(73) Assignee: Yeda Research and Development Company Ltd., Rehovot (IL)

( * ) Notice: Subject to any disclaimer, the term of this patent is extended or adjusted under 35 U.S.C. 154(b) by 0 days.

(21) Appl. No.: 10/519,900

(22) PCT Filed: Jul. 2, 2003

(86) PCT No.: PCT/IL03/00550

§ 371 (c)(1),
(2), (4) Date: Dec. 29, 2004

(87) PCT Pub. No.: WO2004/005806

PCT Pub. Date: Jan. 15, 2004

(65) Prior Publication Data

US 2005/0210876 A1    Sep. 29, 2005

(30) Foreign Application Priority Data

Jul. 2, 2002    (IL) .................................... 150519

(51) Int. Cl.
*F03G 6/00*    (2006.01)
(52) U.S. Cl. .................... 60/641.15; 126/651; 126/655; 126/663
(58) Field of Classification Search ............. 60/641.8, 60/641.15; 126/651, 655, 663, 664, 665
See application file for complete search history.

(56) References Cited

U.S. PATENT DOCUMENTS

| 4,055,948 | A |   | 11/1977 | Kraus et al. |
| 4,096,861 | A | * | 6/1978 | Bowles ..................... 126/586 |
| 4,210,126 | A | * | 7/1980 | Kellberg et al. ............ 126/655 |
| 4,313,304 | A |   | 2/1982 | Hunt |
| 4,426,999 | A | * | 1/1984 | Evans et al. ................ 126/669 |
| 4,499,893 | A |   | 2/1985 | Hunt et al. |
| 4,527,548 | A | * | 7/1985 | Gustafson ................... 126/607 |
| 4,633,854 | A |   | 1/1987 | Mayrhofer |
| 5,945,145 | A |   | 8/1999 | Narsutis et al. ............. 426/123 |

FOREIGN PATENT DOCUMENTS

| EP | 0 552 732 A1 | 7/1993 |
| EP | 0972719 | 1/2000 |
| WO | 96/25633 A2 | 8/1996 |
| WO | WO0058166 | 10/2000 |
| WO | WO0058174 | 10/2000 |
| WO | 01/12314 A1 | 2/2001 |

* cited by examiner

*Primary Examiner*—Hoang Nguyen
(74) *Attorney, Agent, or Firm*—Nath & Associates PLLC; Gary M. Nath; Gregory B. Kang

(57) ABSTRACT

A solar receiver (2) comprises a housing (4) defining a receiver chamber (12) and an aperture (14); a window (16) mounted in the aperture (14); at least two inlet means (17) axially spaced from the window (16) and positioned at different distances therefrom for the injection into the receiver chamber (12) of different flows of workind fluid; an outlet means (18) for the ejection of the working fluid out of the receiver chamber (12); and absorption control means for the provision of the different flows of the working fluid with different capability to absorb solar radiation

14 Claims, 1 Drawing Sheet

SOLAR RECEIVER WITH A PLURALITY OF WORKING FLUID INLETS

FIELD OF THE INVENTION

The invention relates to a solar receiver designed for admitting concentrated solar radiation and converting its energy into another form of energy.

BACKGROUND OF THE INVENTION

A receiver of the kind to which the present invention refers typically has a housing with an interior space called a receiver chamber, and a window mounted in the housing to allow the concentrated radiation to enter the receiver chamber. The receiver housing also includes an inlet for the ingress into the receiver chamber of a working fluid which, when heated by the concentrated radiation, converts the heat into another form of energy. The working fluid may comprise components which, when heated, perform a chemical reaction. The receiver housing also comprises an outlet for the egress of the working fluid, possibly with the reaction products, from the receiver chamber. Examples of a solar receiver of this kind may be found in U.S. Pat. No. 4,313,304 and WO 01/12314.

In a solar receiver as described above, it is desired that all the energy of concentrated solar radiation entering the receiver chamber be absorbed therein by the working fluid to allow the most efficient energy conversion. However, in practice, a part of the incoming radiation absorbed in the receiver chamber is re-irradiated back to the surrounding through the receiver aperture. The higher the temperature of the chamber walls, the more radiation is emitted thereby, increasing energy losses and thus reducing the receiver efficiency.

U.S. Pat. No. 4,499,893 attempts to solve the above problem by ensuring that the working fluid together with chemical reactants comprised therein reach their maximal temperature and are withdrawn from the receiver chamber in the closest vicinity of the window. In the receiver of U.S. Pat No. 4,499,893 the window is mounted in an aperture formed in a front wall of the receiver chamber, inlet ports are arranged in side walls of the chamber for the ingress of the working fluid therein at locations remote from the window, and an outlet is in the form of an outlet opening in a rear wall of the chamber with a quartz exhaust pipe extending from the vicinity of the window through the outlet opening to the outside of the chamber. In consequence of this design, the working fluid is intended to absorb most of the radiation passing through the window in its vicinity just before the working fluid enters the exhaust tube so as to ensure that chemical reaction between the reactants of the working fluid take place inside the tube. Thereby, heating of the walls of the receiver is essentially reduced.

SUMMARY OF THE INVENTION

The present invention provides a solar receiver having a receiver chamber with a working fluid and a window at its front end, wherein measures are taken to ensure that the working fluid and, consequently, walls of the receiver chamber are heated to their highest temperatures at a region in the receiver chamber, which is relatively remote from the window and, preferably, has a relatively small cross-sectional area, whereas most of the chamber has temperature that is significantly lower and therefore re-radiation losses from the walls are substantially reduced.

In accordance with the present invention, this is obtained by:

the provision in the receiver chamber of at least two inlet means spaced from said window and positioned at different distances therefrom for the injection into the receiver chamber of a working fluid characterized by a capability to absorb solar radiation; and the injection in said at least two inlet means of corresponding at least two flows of the working fluid such that the capability to absorb solar radiation of the flow of the working fluid injected via the inlet means located farther from the window is higher than that of the flow of the working fluid injected via the inlet means located closer to the window.

Consequently, heating of the working fluid to the highest temperatures occurs farther from the window, whereby re-radiation losses through the window are essentially minimized.

The meaning of the term 'spaced from the window' used in the present application and claims with respect to the at least two inlet means is that the distance between said inlet means and the window is greater than that at which cooling or protecting fluid is normally directed along the window's surface to cool or protect the window, as for example, in WO 96/25633 or WO 01/12314.

The difference in absorption capability between the two or more flows of the working fluid entering the receiver chamber in accordance with the present invention may be obtained, for example, by the provision therein of different concentrations of particles which absorb solar radiation and get heated thereby to efficiently heat other components of the working fluid. In particular, in accordance with the present invention, the concentration of such particles in the working fluid flow entering the receiver chamber farther from the window is higher than in that entering the receiver chamber closer thereto.

In the receiver of the present invention, the concentration of particles in the different flows of the working fluid as well as the kind of such particles may be controlled automatically depending on working conditions.

In addition to the control of the concentration of the solar absorbing particles, it may be useful to have independent control of such parameters of the working fluid flows entering the receiver chamber as their rates and angles at which the flows are injected.

The effect of lowering energy losses by means of the invention is increased dramatically as the required overall operating temperature of the receiver increases. Without being bound to theory, this may be explained by the known dependency of the re-radiation losses on the fourth power of the temperature:

$$\text{Reradiation losses} \sim \int \epsilon T^4 F \, dA,$$

wherein $\epsilon$ is the local emissivity of a wall area element $dA$, $T$ is the local temperature of said area element, $F$ is the view factor between said area element and the receiver aperture, and the integral is over the entire surface area of the chamber wall.

The exact values of the capability to absorb energy of the working fluid at its various entries to the receiver chamber may vary according to the shape of the receiver chamber, the working temperature and other working conditions of the receiver and the like.

BRIEF DESCRIPTION OF THE DRAWINGS

In order to understand the invention and to see how it may be carried out in practice, a specific embodiment will now be described, by way of non-limiting example only, with reference to the accompanying drawings, in which.

DETAILED DESCRIPTION OF EMBODIMENTS OF THE INVENTION

Figure 1:
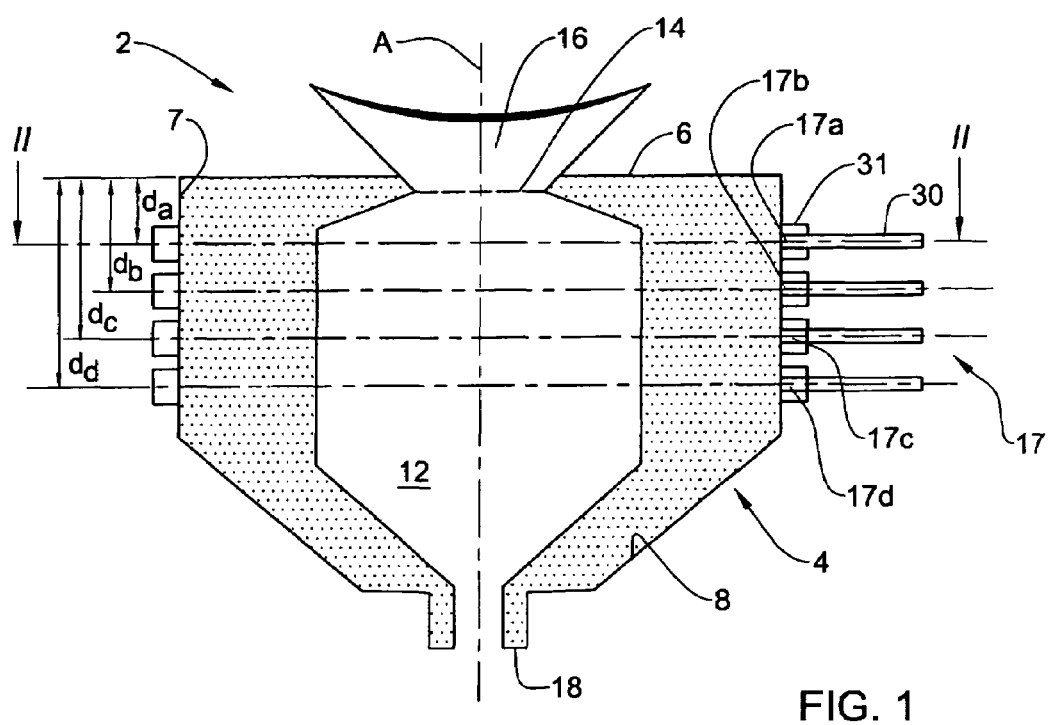
FIG. 1 is a schematic illustration of a solar energy receiver according to one embodiment of the invention.

FIG. 1 shows a solar receiver 2 according to one embodiment of the present invention, adapted for the admission of solar radiation highly concentrated (up to several thousand suns) by a suitable solar concentrator (not shown), known in the art per se, for heating a working fluid (not shown) in the receiver, adapted for the operation under elevated pressures of up to about 20 atmospheres. The working fluid, when heated is used for the conversion of its heat into another form of energy. This conversion may be performed in the receiver cavity, when heat absorbed by the working fluid initiates a chemical reaction between different reactants comprised in the working fluid. Alternatively, the working fluid after having been heated may be transferred to another site for the withdrawal of heat therefrom.

The receiver 2 includes a thermally isolated metal housing 4 with a receiver chamber 12 having a front wall 6, a side wall 7, a rear wall 8 and a longitudinal central axis A extending between the front and rear walls. The chamber 12 has a front region defined by the front wall 6 and the adjacent front half of the side wall 7, and a rear region defined by the rear wall 8 and the adjacent rear half of the side wall 7. As seen, the cross-sectional area of the rear region is smaller than that of the front region.

The front wall 6 is formed with an aperture 14 holding a window 16 for the admission of solar radiation and passing it into the receiver chamber. The aperture 14 is located in, or in the vicinity of, the focal plane of the solar concentrator. The window 16 may have any shape known in the art per se. It could be flat, if the pressure within the chamber were atmospheric or close thereto, but since this is normally not the case and the pressure within the chamber is higher, the window is preferably concave. It may also be shaped as an axi-symmetric dome, to improve its capability to withstand high temperatures such as about 500° C. and higher. The window may also be frusto-conical and capped frusto-conical, or may have any other appropriate shape.

The solar receiver 2 has a plurality of inlet means 17 formed in the housing 4 for the injection of different flows of the working fluid into the receiver chamber 12 through inlet ports 17a, 17b, 17c and 17d formed in the side wall 7 of the receiver chamber 12. The inlet ports 17a to 17d are all spaced from the aperture 14 to different axial distances $d_a$ to $d_d$ therefrom. The rear wall 8 of the receiver chamber is formed with an outlet port 18 for the withdrawal of the working fluid from the receiver chamber 12.

The receiver further comprises means (not shown) for the provision of the different flows of the working fluid injecting into the receiver chamber 14 via the inlet ports 17a to 17d, with different absorption capability, particularly, with different concentration of solar absorbing particles. Such concentration control means are adapted to make sure that the concentration in the working fluid flows increases from its lowest value in the working fluid flow injected via the inlet port 17a to the highest value in the working fluid flow injected via the inlet port 17d, so that the absorption capability of the working fluid gradually increases with the increase of the axial distance from the window of the location of its injection. The concentration control means with which the inlet means 17 are connected may be in the form of different sources of working fluid having different parameters. Alternatively, the receiver may be associated with single source of working fluid free of solar absorbing particles or having some initial small concentration thereof, which single source is provided with a flow distributor for dividing the working fluid into a plurality of flows to be forwarded to different inlet means 17, and with a source of solar absorbing particles, wherefrom particles are added to the different flows in different amounts, in accordance with desired values of concentration to be obtained in these flows.

It should be mentioned that with the working fluid comprising solar absorbing particles, the inlet port that is closest to the aperture 14 should still be spaced therefrom so as to minimize contact with the window 16 of the solar absorbing particles comprised in the working fluid flow injected therethrough.

It should be also mentioned that the receiver may further comprise an additional inlet means e.g. such as disclosed in WO 96/25633 or WO 01/12314 for the introduction along the window of a cooling or protecting flow of fluid. Clearly, this flow should be completely free of any solar absorbing particles.

The inlet ports 17a to 17d may further be provided with individual means for the independent control of other parameters of the working fluid flow therethrough, such as for example, the flow rate and the angle at which the working fluid is injected in the receiver chamber.

Figure 2:
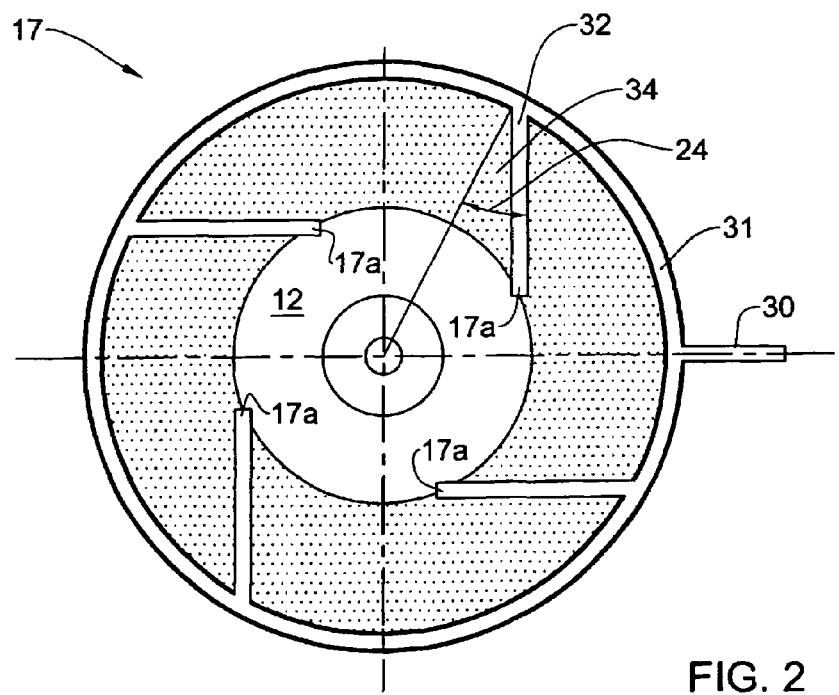
FIG. 2 is a cross-section in the solar energy receiver of FIG. 1.

FIG. 2 illustrates one example of the design of the inlet means 17 and it shows a cross-sectional view of the receiver taken through one of the inlet means, i.e. that having inlet ports 17a. As seen, the inlet means 17 includes a pipe 30 connectable to a source of the working fluid (not shown) providing a corresponding predetermined concentration of solar absorbing particles, a manifold 31 connected to the pipe 30 and a plurality of inlet nozzles 32 terminating at a plurality of the inlet ports 17a, all in fluid communication with the manifold 31. The inlet nozzles 32 have all different circumferential location and a substantially tangential orientation relative to the receiver chamber 12. An angle 34 of the orientation of the inlet nozzles 32 may be independently controllable for each of the inlet means 17.

The receiver chamber 12 is preferably elongated and converging towards the outlet port 18, however, generally, it may have any appropriate shape known in the art per se. It may be shaped as a cylinder, or cone, or a combination thereof, or it may be in the form of a dome, may have spindled or oval shape, or the like.

In operation, solar radiation enters the solar energy receiver 2 through the window 16. The working fluid is injected into the receiver through the inlet means 17 in a plurality of flows while the concentration of the solar absorbing particles in different flows, and, optionally, also the rate of these flows and the injection angle 34, are controlled at each of these means to achieve a maximal temperature of the working fluid at the rear region of the chamber. Consequently, the walls of the receiver chamber 12 have maximal temperature and maximal re-radiation at the rear region of the receiver chamber where the amount of re-radiation capable to escape through the window and, consequently, the heat losses in the receiver are minimal. Thereby, the energy-conversion efficiency of the receiver 2 may be essentially increased in comparison to the efficiency of a similar receiver having only one inlet means or having more than one inlet means, but all of them adapted to inject in a receiver chamber working fluid having the same solar absorption parameters.

EXPERIMENTAL RESULTS

Table 1 summarizes the test results from a few representative tests out of about 30, conducted separately with four different working gases in a receiver chamber of the kind to which the present invention refers. Both wall and gas temperatures were lowest near the aperture and increased with distance from it. Maximum wall and gas temperatures were measured near the gas outlet port. Table 1 shows only the temperature near the gas outlet port. As can be seen from the table, the measured temperatures were, in general, very high relative to those normally used in other solar receivers. In all cases, the exit gas temperature was higher than the temperature of the chamber rear wall adjacent the gas outlet port, demonstrating the non-isothermal effect described above.

TABLE 1

Selected test results

| Gas | Wall temperature near gas outlet [K] | Exit gas temperature [K] | DT [K] | Particle Loading at Tg max [g/m3] |
|---|---|---|---|---|
| Ar | 1720 | 1834 | 114 | 7.0 |
| N2 | 1847 | 2079 | 232 | 3.8 |
| N2 | 1748 | 2118 | 370 | 2.7 |
| N2 | 1707 | 2008 | 301 | 3.5 |
| N2 | 1836 | 1993 | 157 | 6.0 |
| N2 | 1867 | 2017 | 150 | 5.3 |
| N2 | 1792 | 1962 | 170 | 5.1 |
| N2 | 1579 | 1887 | 308 | 2.4 |
| N2 | 1651 | 1843 | 192 | 5.0 |
| Air | 1725 | 1903 | 178 | 4.5 |
| CO2 | 1748 | 1878 | 130 | 4.7 |
| CO2 | 1698 | 1789 | 91 | 5.3 |
| CO2 | 1698 | 1744 | 46 | 2.1 |
| CO2 | 1607 | 1659 | 52 | 6.2 |

Although a description of specific embodiments have been presented, it would be clear for a skilled person that variations could be made thereto without deviating from the major idea of the invention.

The invention claimed is:

1. A solar receiver for receiving solar radiation and converting its energy into another form of energy, the receiver comprising:
   (a) a housing defining a receiver chamber having a longitudinal central axis and an aperture;
   (b) a window mounted in said aperature and adapted for the admission of concentrated solar radiation and passing it into said receiver chamber;
   (c) at least two inlet means axially spaced from said window and positioned at different distances therefrom for the injection into the receiver chamber of different flows of working fluid;
   (d) an outlet means for the ejection of the working fluid out of the receiver chamber; and
   (e) absorption control means for the provision of said different flows of the working fluid with different capability to absorb solar radiation such that said capability is higher in the flow of the working fluid adapted for the introduction in said chamber via that one of said at least two inlets which is spaced from said window to a greater distance.

2. A solar receiver according to claim 1, having at least three said inlet means, wherein said absorption control means ensure that said capability to absorb solar radiation in the corresponding different flows of the working fluid are independent of one another.

3. A solar receiver according to claim 2, wherein said capability of the working fluid, in said different flows, to absorb solar radiation, gradually increases from a minimal capability in the flow of the working fluid adapted for the injection into said chamber via the inlet means closest to the window to a maximal capability in the flow of the working fluid adapted for the injection via the inlet means farthest from said window.

4. A solar receiver according to claim 1, wherein said receiver chamber has a front wall, a rear wall and a side wall extending therebetween, the front wall having said aperture, the rear wall having said outlet means and the side wall being formed with said at least two inlet means.

5. A solar receiver according to claim 1, wherein said capability of the working fluid to absorb solar radiation is defined by the concentration of solar absorbing particles in the working fluid.

6. A solar receiver according to claim 5, wherein said differing flows of the working fluid injected into the receiver chamber have different concentrations of said solar absorbing particles.

7. A solar receiver according to claim 1, wherein said chamber has a cross-sectional area at a region adjacent said outlet means smaller than that adjacent said aperture.

8. A solar receiver according to claim 1, wherein said chamber has an elongated shaped, a front region defined by the front wall and a front half of the side wall and a rear region defined by said rear wall and a rear half of the side wall, wherein said two inlet means are located in the different regions of the chamber.

9. A solar receiver according to claim 1 further comprising means for said parameters of the controlling flow rate and/or injection angles of said different flows of the working fluid.

10. A solar receiver according to claim 1, comprising an additional inlet for the injection therethrough of a coolant or a protecting fluid flow along said window.

11. A solar receiver according to claim 1, wherein each of said at least two inlet means includes a plurality of inlet ports.

12. A method for introducing a working fluid in a solar receiver accord to claim 1, comprising injecting the working fluid in different fluid flows such that, in regions farther spaced from the window, capability of the working fluid to absorb solar radiation is higher than in regions located closer to the window.

13. A method according to claim 12, wherein the capability of the working fluid to absorb solar radiation is defined by concentration of solar absorbing particles contained therein.

14. A method according to claim 12, wherein said working fluid is characterized by at least one parameter selected from a flow rate of the working fluid, and an angle at which the working fluid is injected into the chamber, and these parameters are controlled to increase the temperature of the working fluid in the flow thereof injected farther from the window.

* * * * *